US010019354B2

United States Patent
Jayakumar et al.

(10) Patent No.: US 10,019,354 B2
(45) Date of Patent: Jul. 10, 2018

(54) APPARATUS AND METHOD FOR FAST CACHE FLUSHING INCLUDING DETERMINING WHETHER DATA IS TO BE STORED IN NONVOLATILE MEMORY

(71) Applicant: Intel Corporation, Santa Clara, CA (US)

(72) Inventors: Sarathy Jayakumar, Portland, OR (US); Mohan J. Kumar, Aloha, OR (US); Eswaramoorthi Nallusamy, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 14/100,721

(22) Filed: Dec. 9, 2013

(65) Prior Publication Data

US 2015/0161037 A1 Jun. 11, 2015

(51) Int. Cl.
*G06F 12/08* (2016.01)
*G06F 12/02* (2006.01)
(Continued)

(52) U.S. Cl.
CPC ...... *G06F 12/0246* (2013.01); *G06F 12/0868* (2013.01); *G06F 12/0804* (2013.01); *G06F 12/0866* (2013.01); *G06F 12/0891* (2013.01); *G06F 2212/1032* (2013.01); *G06F 2212/7203* (2013.01)

(58) Field of Classification Search
CPC ......... G06F 12/0246; G06F 2212/7209; G06F 12/0891; G06F 12/0866; G06F 12/0804; G06F 2212/28; G06F 2212/31; G06F 2212/60; G06F 2212/69; G06F 2212/2022; G06F 12/0868; G06F 2212/1032; G06F 2212/7203
See application file for complete search history.

(56) References Cited

U.S. PATENT DOCUMENTS 6,205,521 B1 * 3/2001 Schumann .......... G06F 12/0804
  711/133
7,752,173 B1 * 7/2010 Gole ................... G06F 11/2097
  707/654

(Continued)

*Primary Examiner* — Glen Gossage
(74) *Attorney, Agent, or Firm* — Thorpe North & Western, LLP

(57) ABSTRACT

Apparatus, systems, and methods to manage memory operations are described. A cache controller is provided comprising logic to receive a transaction to operate on a data element in a cache memory, determine whether the data element is to be stored in a nonvolatile memory by querying a source address decoder (SAD), and, in response to a determination that the data element is to be stored in the nonvolatile memory, to forward the transaction to a memory controller coupled to the nonvolatile memory, and, in response to a determination that the data element is not to be stored in the nonvolatile memory, to drop the transaction from a cache flush procedure of the cache controller. Additionally, the cache controller may receive a confirmation signal from the memory controller that the data element was stored in the nonvolatile memory, and return a completion signal to an originator of the transaction. The cache controller may also include logic to place a processor core in a low power state.

7 Claims, 10 Drawing Sheets

(51) Int. Cl.
*G06F 12/0868* (2016.01)
*G06F 12/0891* (2016.01)
*G06F 12/0866* (2016.01)
*G06F 12/0804* (2016.01)

(56) References Cited

U.S. PATENT DOCUMENTS

| | | | | |
|---|---|---|---|---|
| 8,321,701 B2* | 11/2012 | Obr | ............................ | G06F 1/30 |
| | | | | 711/118 |
| 8,364,899 B2* | 1/2013 | Ambroladze | ......... | G06F 12/126 |
| | | | | 711/133 |
| 2002/0124135 A1* | 9/2002 | Newman | ............. | G06F 12/0866 |
| | | | | 711/113 |
| 2003/0084252 A1* | 5/2003 | Talagala | .............. | G06F 12/0866 |
| | | | | 711/135 |
| 2005/0235131 A1* | 10/2005 | Ware | ................... | G06F 12/0292 |
| | | | | 711/203 |
| 2008/0104332 A1* | 5/2008 | Gaither | ............... | G06F 12/0815 |
| | | | | 711/141 |
| 2010/0023945 A1* | 1/2010 | Tsien | .................. | G06F 12/0831 |
| | | | | 718/101 |
| 2014/0068197 A1* | 3/2014 | Joshi | ..................... | G06F 3/0659 |
| | | | | 711/135 |
| 2014/0281240 A1* | 9/2014 | Willhalm | ............ | G06F 12/0811 |
| | | | | 711/122 |
| 2015/0186278 A1* | 7/2015 | Jayakumar | .......... | G06F 12/0804 |
| | | | | 711/103 |

* cited by examiner

| Address Range | Destination Node ID | Attribute |
|---|---|---|
| 00000000-0000FFFF | 001 | NVM = Yes |

| 00FFFFFF-FFFFFFFF | 010 | NVM = No |

US 10,019,354 B2

APPARATUS AND METHOD FOR FAST CACHE FLUSHING INCLUDING DETERMINING WHETHER DATA IS TO BE STORED IN NONVOLATILE MEMORY

FIELD

The present disclosure generally relates to the field of electronics. More particularly, some examples generally relate to techniques to implement a fast cache flush in electronic devices.

BACKGROUND

It may be useful for electronic devices to store data in a non-volatile memory such that the data remains intact when power to the electronic device is turned off or otherwise lost. The non-volatile memory device for storing digital information in an array of non-volatile memory cells may be included in a Non-Volatile Dual In-line Memory Module (NVDIMM). Digital information stored in the non-volatile memory (for example, NAND/NOR flash memory) persists in the memory during power loss or system failures. After power to the electronic device is restored, the electronic device can access the stored digital data from the NVDIMM.

Logic executing in an electronic device can modify data stored in non-volatile memory. For example, logic executing on a processor of the electronic device may update a data element stored in non-volatile memory. In such an instance, the logic retrieves a copy of the data element stored in non-volatile memory and stores a copy of the data element in a volatile memory, e.g., cache memory.

The logic may update the data while the data element is stored in volatile memory. Subsequent to completing any changes to the copy of the data element stored in volatile memory, the logic may return the updated data element to non-volatile memory.

If a failure such as loss of power occurs prior to complete storage of a modified data element into non-volatile memory, it is possible that none or only a portion of the data element will be written to non-volatile memory. In such an instance, the power failure results in loss of data because the modified data element is not properly stored in non-volatile memory.

BRIEF DESCRIPTION OF THE DRAWINGS

The detailed description is provided with reference to the accompanying figures. The use of the same reference numbers in different figures indicates similar or identical items.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Described herein are techniques to implement fast cache flush in processing systems of electronic devices. Some examples described herein may find utility in multi-core processor devices which include integrated cache memory. More particularly, some examples described herein may find utility in electronic devices which flush processor cache to nonvolatile memory in response to a power failure or power interruption.

In brief, multi-core processor devices may flush processor cache to nonvolatile memory. In the event of a power failure, power is maintained for a brief period of time, sometimes referred to as a "hold up time", of a few milliseconds by a backup power source such as capacitors. During the hold up time the data stored in processor cache is written to non-volatile memory.

Processor cache sizes are increasing rapidly. Depending upon factors such as the memory topology and communication link speed, processor cache can overwhelm the capacity of the system architecture to write cache data to non-volatile memory within the hold up time. This, in turn, can result in loss of data.

Techniques described herein address this issue by implementing a fast cache flush procedure which prioritizes cache transactions that are targeted to nonvolatile memory, while cache transactions which are targeted to volatile memory are dropped from the cache flush procedure so they don't consume bandwidth and processing resources. In some examples a cache controller determines the target of a cache transaction by referring to a configuration table which includes an attribute field that specifies whether a memory transaction is targeted to nonvolatile memory. In the context of a fast cache flush procedure, only cache transactions that are targeted to nonvolatile memory are written to nonvolatile memory.

Further, in some examples implemented in multi-core processors each processor core may include a fast cache logic which manages the cache flush process, such that cache flush operations may be implemented in parallel. Additional structural features and operations to implement fast cache flush will be described with reference to FIGS. 1-5, below.

Figure 1:
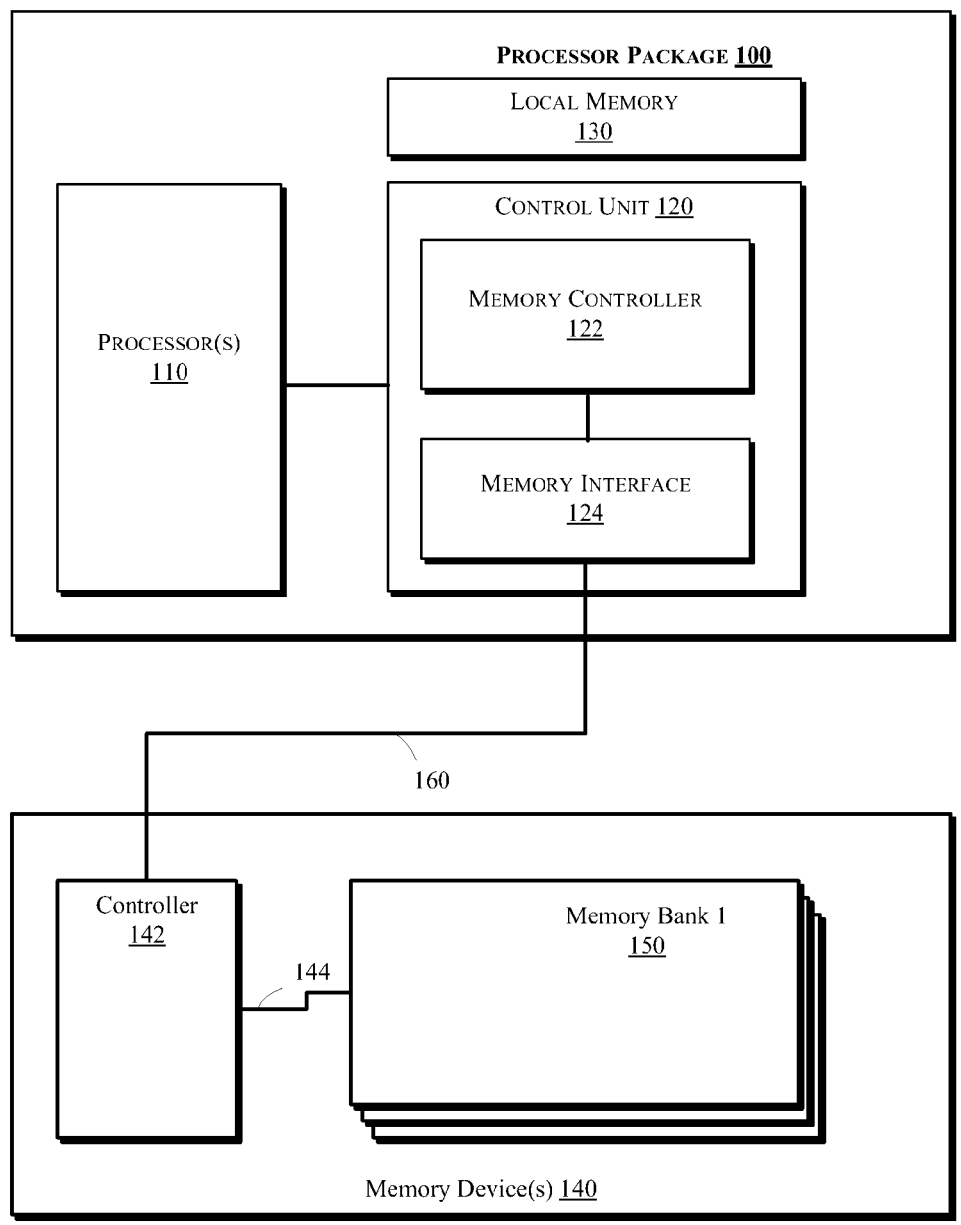
FIG. 1 is a schematic, block diagram illustration of components of apparatus to implement fast cache flush in accordance with various examples discussed herein.

FIG. 1 is a schematic, block diagram illustration of components of apparatus to implement fast cache flush in accordance with various examples discussed herein. Referring to FIG. 1, in some examples a processor package 100 may comprise one or more processors 110 coupled to a control unit 120 and a local memory 130. Control unit 120 comprises a memory controller 122 and a memory interface 124.

Memory interface 124 is coupled to one or more remote memory devices 140 by a communication bus 160. Memory device 140 may comprise a controller 142 and one or more memory banks 150. In various examples, at least some of the memory banks 150 may be implemented using nonvolatile memory, e.g., phase change memory, ferroelectric random-access memory (FeRAM), nanowire-based non-volatile memory, memory that incorporates memristor technology, a static random access memory (SRAM), three dimensional (3D) cross point memory such as phase change memory (PCM), spin-transfer torque random access memory (STT-RAM) or NAND memory. In some examples the memory device(s) 140 may comprise one or more nonvolatile direct in-line memory modules (NVDIMMs) coupled to a memory channel 144 which provides a communication link to controller 142. The specific configuration of the memory bank(s) 150 in the memory device(s) 140 is not critical.

Figure 2:
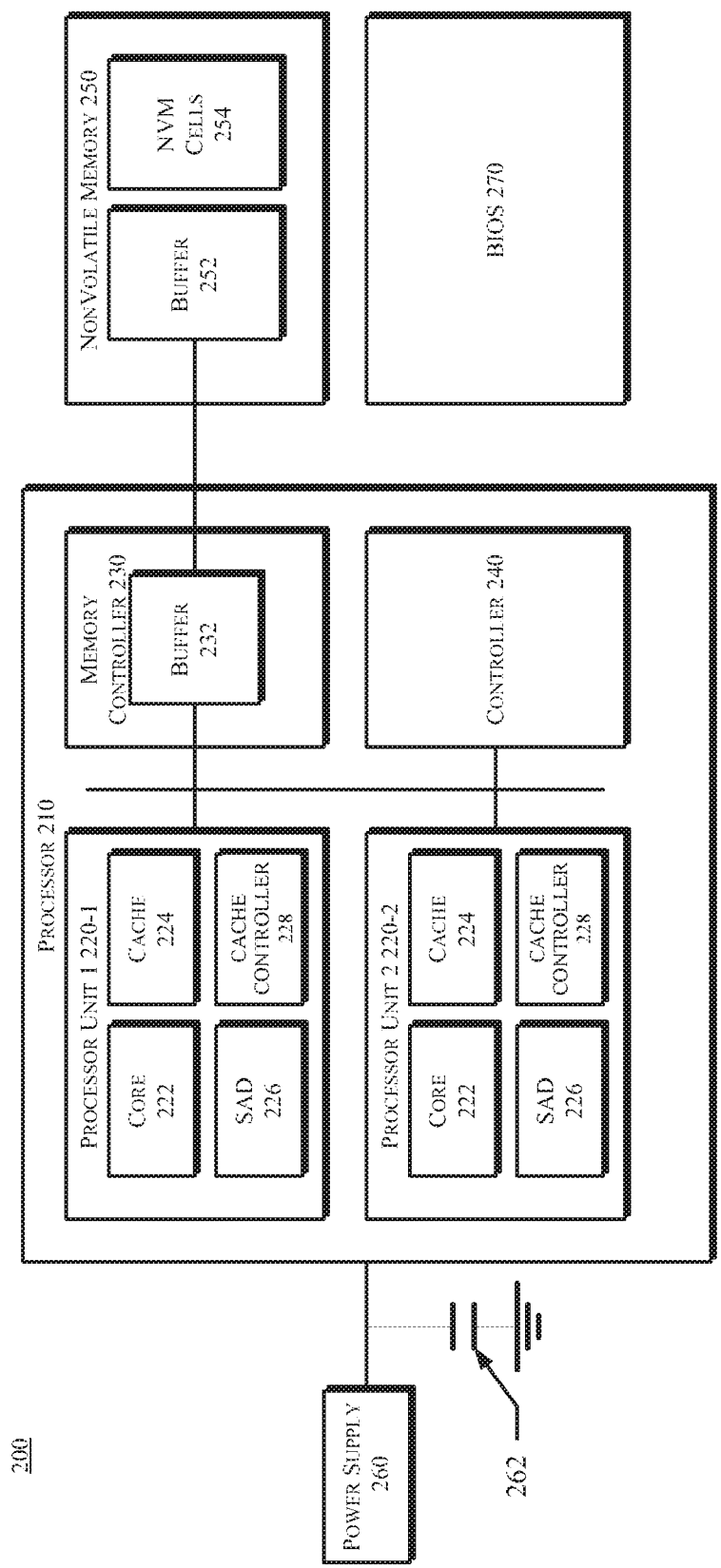
FIG. 2 is a schematic block diagram of a processing environment which may be adapted to implement fast cache flush in accordance with various examples discussed herein.

FIG. 2 is a schematic block diagram of a processing environment that may be adapted to implement fast cache flush in accordance with various examples discussed herein. Referring to FIG. 2, a processing environment 200 may comprise at least one processor 210 coupled to a power supply 260 and to nonvolatile memory 250. An energy storage device 262 such as one or more capacitors stores a portion of the power provided by power supply 260. As described above, in the event of a power failure such as a condition in which the power supply 260 no longer outputs power in a proper voltage range to power processing environment 200, the energy stored in energy storage resource or device 262 continues to provide appropriate power to processor 210 for at least a limited amount of holdup time.

Processor 210 may comprise one or more processor units 220-1, 220-2, which may be referred to herein collectively by reference numeral 220. Processor 210 may further comprise a memory controller 230 having a buffer 232 and a controller 240. Each processor unit 220 may comprise a core 222, cache memory 224, a decoder logic 226 referred to herein as a source address decoder (SAD), and a cache controller 228.

The processor core(s) 222 execute logic instructions to implement one or more processing threads. Core(s) 222 may work independently or cooperatively to define a multi-core processing environment. Cache 224 may be implemented as multi-level fast access cache defined in volatile memory, typically on the same die as the core(s) 222.

Figure 3:
FIG. 3 is a schematic illustration of a configuration table which may be used to implement fast cache flush in accordance with various examples discussed herein.
Figure 3:
Figure 3:

The SAD 226 may be established by the system basic input/output system (BIOS), e.g., during a system configuration process, based on factors such as the configuration of the processing environment, the memory topology, interleaving rules, and the like. Referring to FIG. 3, in some examples the SAD 226 may include a plurality of entries in a configuration table that map memory address ranges to specific memory controllers or destination node identifiers (IDs). Further, each entry in the SAD configuration table may include a data field which designates whether the address range maps to nonvolatile memory or to volatile memory.

As described briefly above, in some examples the processing units 220 include a cache controller 228 that implements flush logic which, when executed, implements a fast cache flush to flush cache 224 to nonvolatile memory 250. The operations described herein may find particular utility in the context of a cache flush routine implemented in response to a failure or interruption of power supply. However, the operations described herein may provide utility in contexts other than power failure or power interruption.

Figure 4:
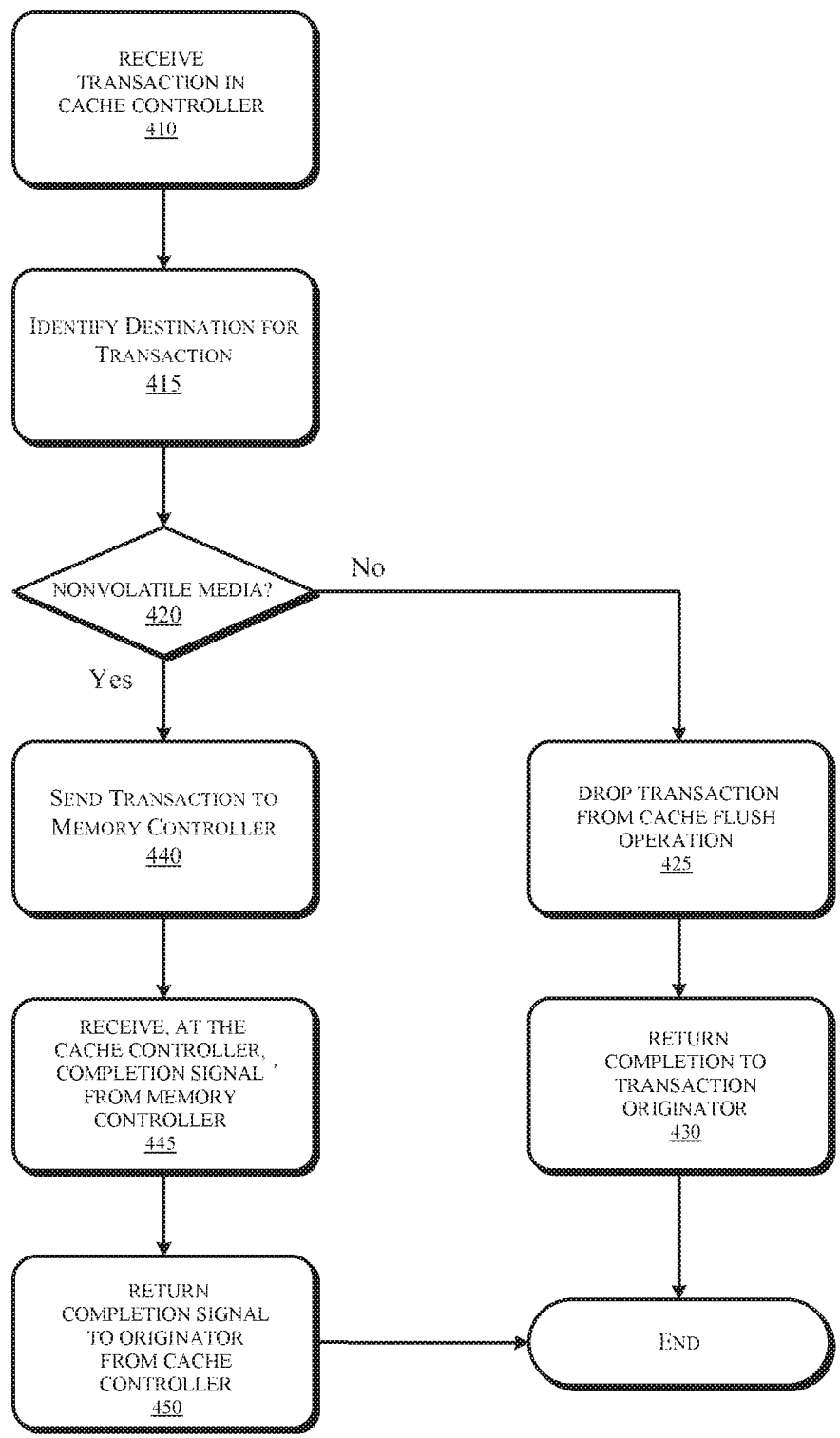
FIG. 4 is a flowchart illustrating operations in a method to implement fast cache flush in accordance with various examples discussed herein.

Operations implemented by flush logic will be described with reference to FIGS. 4 and 5. Referring first to FIG. 4, at operation 410 a transaction is received in cache controller 228, and at operation 415 the cache controller 228 identifies a destination for the transaction. For example, cache flush logic in the cache controller 228 may query the SAD table depicted in FIG. 3 to identify the destination for the transaction.

At operation 420 the cache controller 228 determines whether the destination for the transaction received in operation 410 is nonvolatile memory. By way of example, cache flush logic in the cache controller 228 may consult the attribute column of the SAD table depicted in FIG. 3 to determine whether the target destination is nonvolatile media.

If, at operation 420, the destination for the transaction is volatile memory, or not nonvolatile media (NO at operation 520), then control passes to operation 425 and the transaction is dropped from the cache flush operation. In some examples data associated with a transaction that is targeted to volatile memory may be flushed from cache 224, then filtered such that the data is not forwarded to the buffer 232. In other examples data associated with a transaction that is targeted to volatile memory is not flushed from cache 224. In the context of a cache flush routine implemented in response to a failure or interruption from power supply 260, cache transactions for which the destination is volatile memory would be lost when power fails after the hold time. As such, it would be pointless to forward this data from cache to another volatile memory. At operation 430 the cache controller returns a completion signal to the originator of the cache transaction.

By contrast, if at operation 420 the destination for the transaction is nonvolatile media then control passes to operation 440 and the cache controller 228 sends the transaction to the memory controller 230. The data from cache 224 may be stored in the buffer 232 in memory controller 230 then written to nonvolatile memory 250. When the data is received in nonvolatile memory 250 it may be stored temporarily in a volatile memory buffer 252 before being written to nonvolatile memory cells 254, whereupon the nonvolatile memory 250 may return a completion signal to the memory controller 230, which, in turn, forwards a completion signal to the cache controller 228.

At operation 445 the cache controller receives the completion signal from the memory controller 230, and at operation 450 the cache controller 228 returns a completion signal to the originator of the cache transaction.

In some examples each processor unit 220 in a multi-unit processor 210 may include cache flush logic on the cache controller 228, such that the respective caches 224 may be flushed in parallel. FIG. 5 depicts additional operations which may be performed in a fast cache flush procedure. Referring to FIG. 5, at operation 510 the cache controller 228 blocks any further transactions to the processing unit 220. For example, the cache controller may force the processing unit 220 into a low-power state or a sleep state.

At operation 515 the cache controller 228 initiates the cache flush sequence depicted in FIG. 4. If, at operation 520 the cache flush is not complete, then the operations depicted in operation 515 and FIG. 4 may be repeated until the cache 224 is completely flushed from the processor unit 220. When the cache flush completes then control passes to operation 525 and a completion message is sent to the memory controller 230, which at operation 530 flushes its buffer(s) 232 to nonvolatile memory 250. Finally, at operation 535 the memory controller returns a completion signal.

Figure 5:
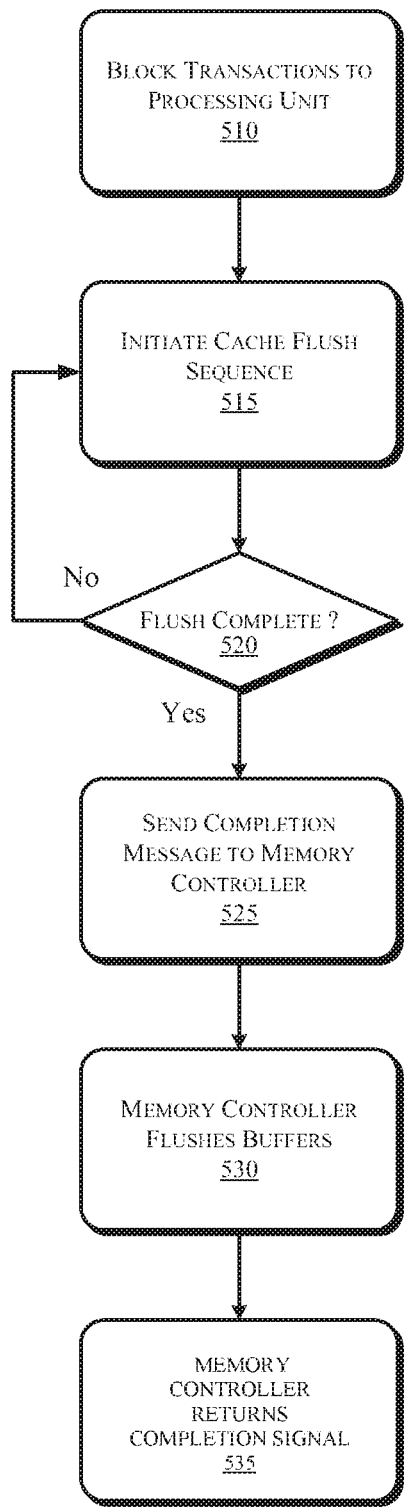
FIG. 5 is a flowchart illustrating additional operations in a method to implement fast cache flush in accordance with various examples discussed herein.

Thus, the operations depicted in FIGS. 4-5 enable a processing unit to implement a fast cache flush procedure which flushes only cache transactions that are targeted to nonvolatile media. Such a fast cache flush procedure may find particular utility in power failure or power interruption situations.

Figure 6:
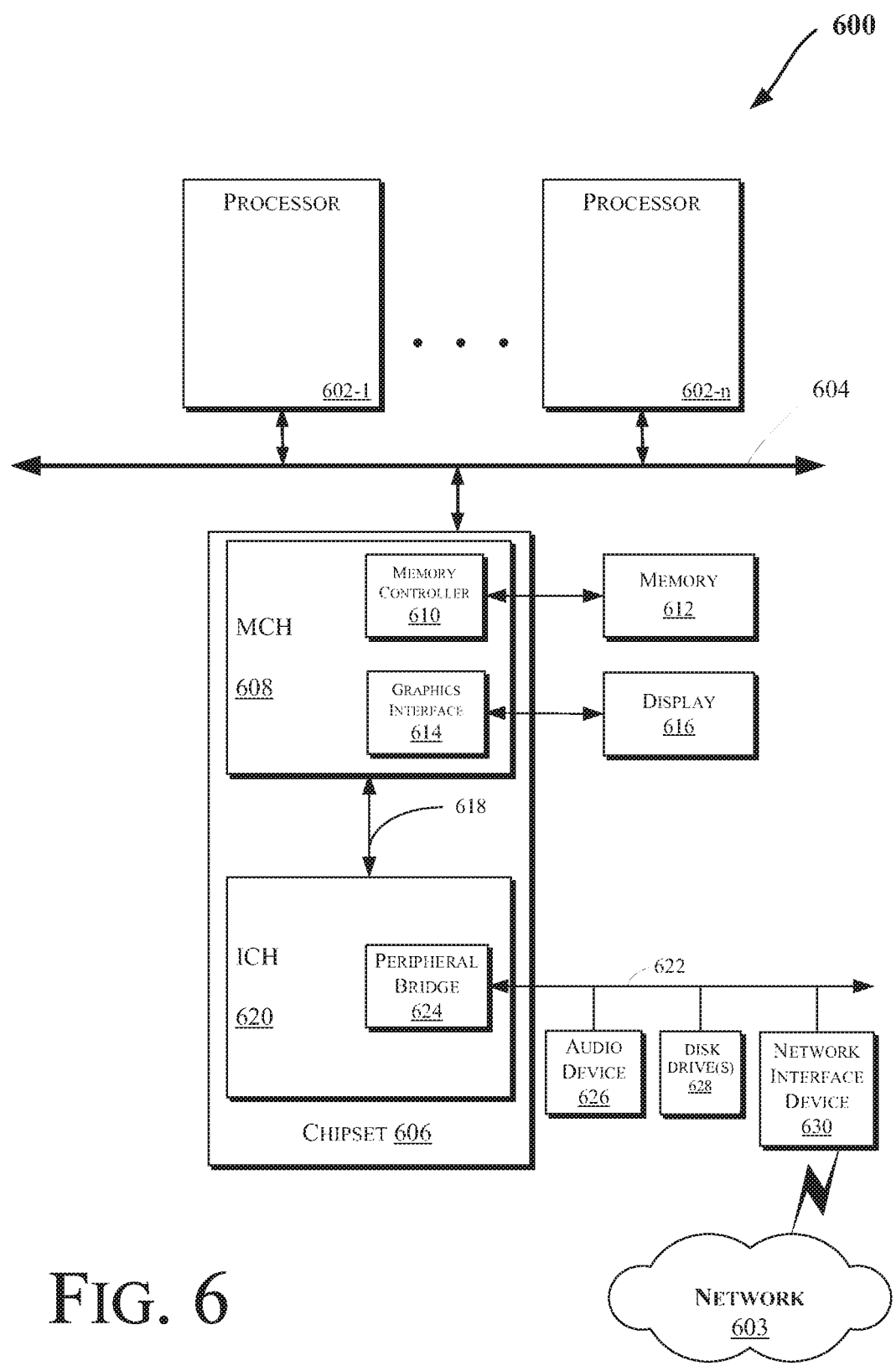
FIG. 6 is a schematic, block diagram illustration of a computing system that may be adapted to implement fast cache flush in accordance with various examples discussed herein.

As described above, in some examples the electronic device may be embodied as a computer system. FIG. 6 illustrates a block diagram of a computing system 600 in accordance with an example. The computing system 600 may include one or more central processing unit(s) (CPUs) or processors 602-1, . . . , 602-n, which may be referred to herein collectively by reference numeral 602, that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 110 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 612 may store data, including sequences of instructions, that may be executed by the CPU 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory, such as a hard disk, may also be utilized. Additional devices may communicate via the interconnection network 604, such as multiple CPUs and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU or processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, a graphics interface 614 may be included within the MCH 608 in other examples, and coupled to a display 616.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically erasable PROM (EEPROM), a disk drive (e.g., 628 in FIG. 6), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
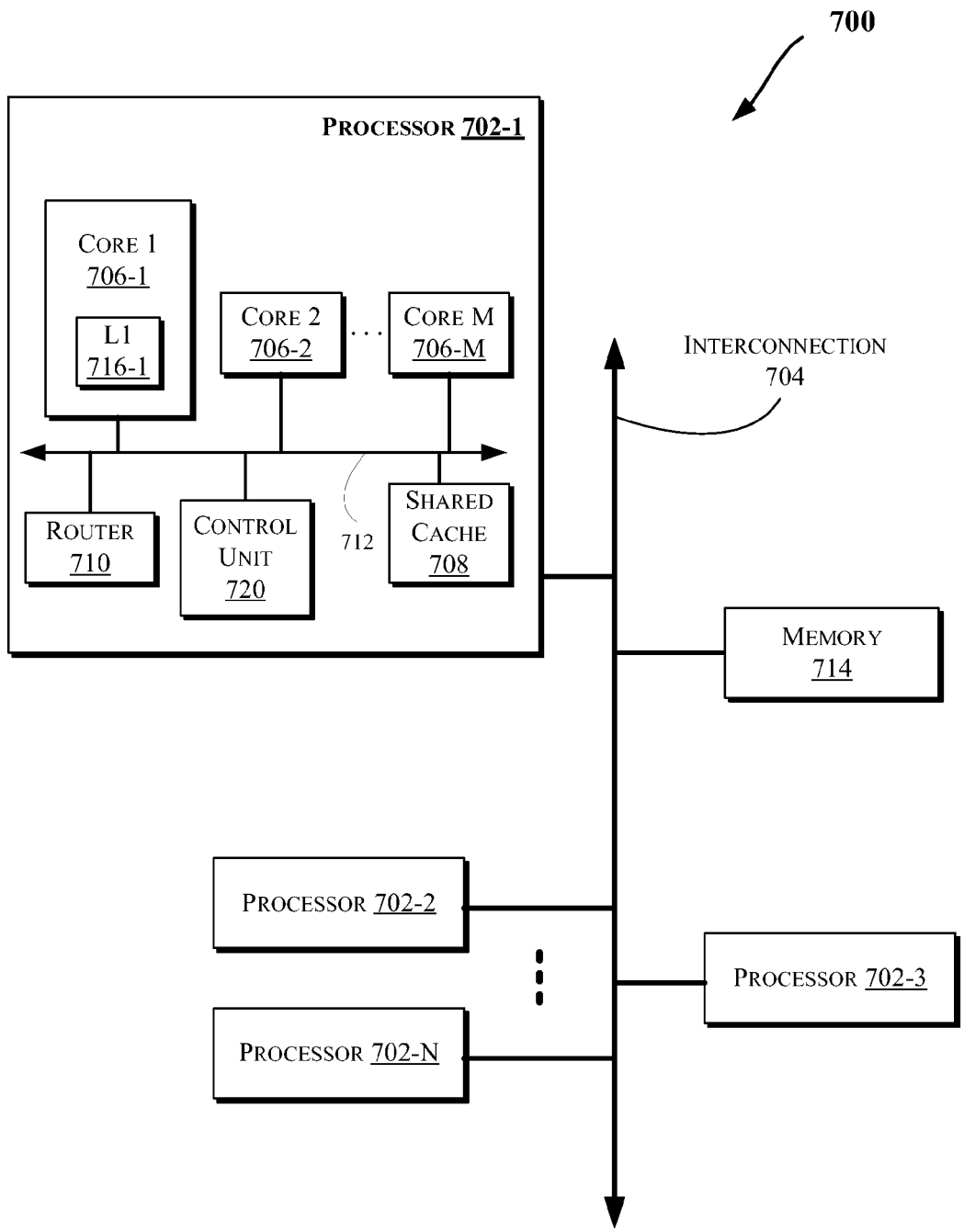
FIG. 7 is a schematic, block diagram illustration of another computing system that may be adapted to implement fast cache flush in accordance with various examples discussed herein.

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as shared cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the shared cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 1.

Figure 8:
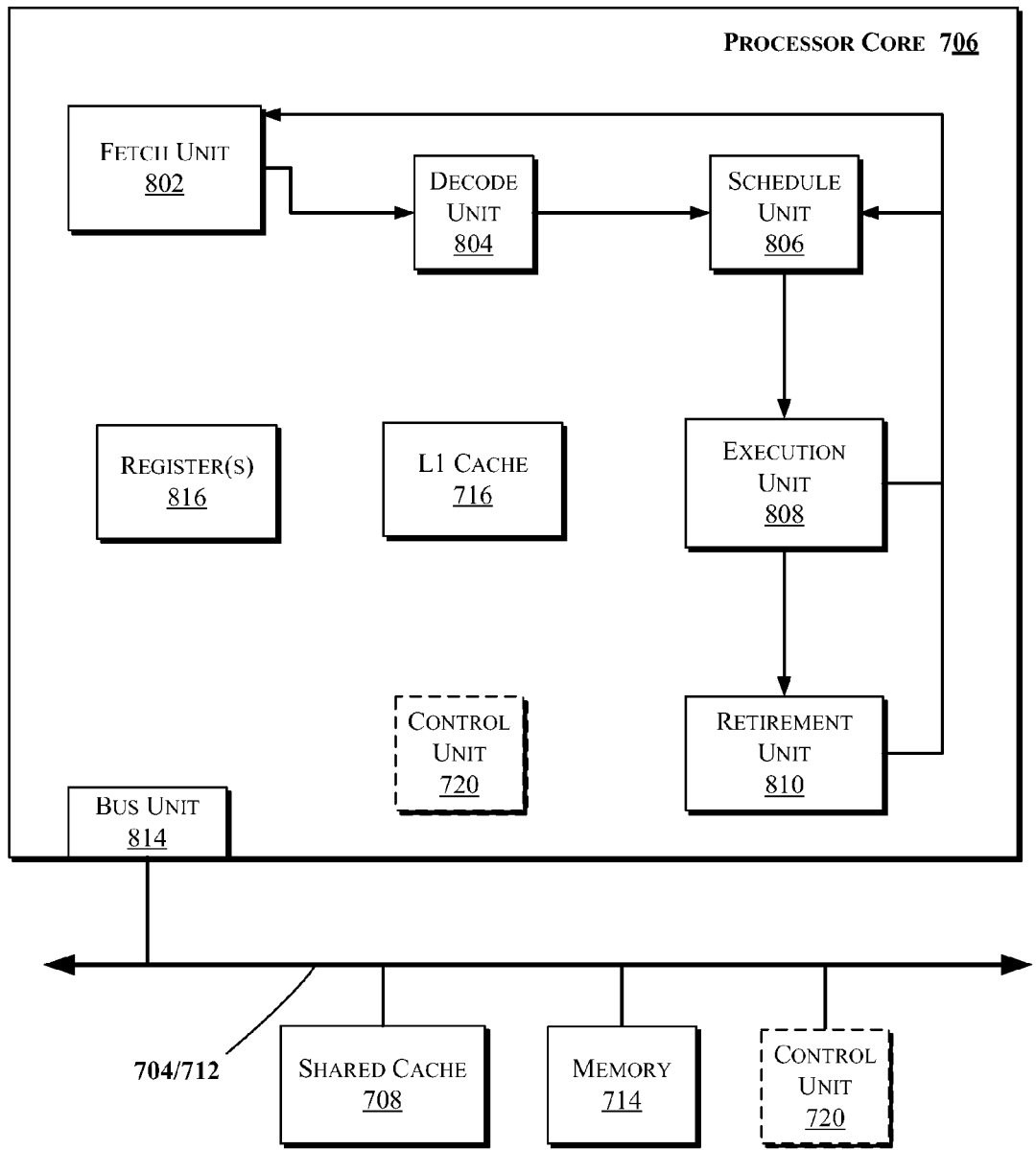
FIG. 8 illustrates a block diagram of portions of a processor core and other related components of a computing system in accordance with various examples discussed herein.

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 712 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 814 to enable communication between components of the processor core 706 and other components (such as the components discussed with reference to FIG. 8) via one or more buses (e.g., buses 704 and/or 712). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 712, in various examples the control unit 720 may be located elsewhere such as inside the core 706, as is shown in FIG. 8, and coupled to the core via bus 704, etc.

Figure 9:
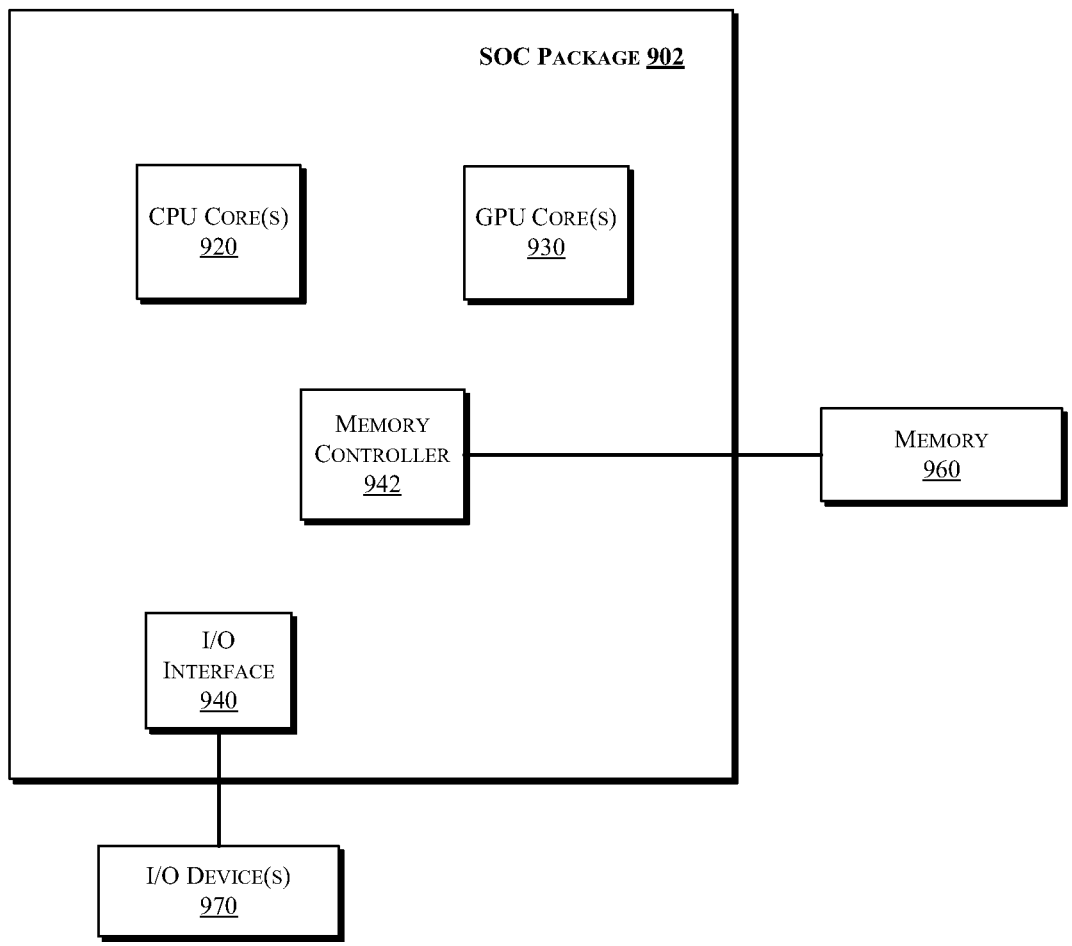
FIG. 9 illustrates a block diagram of a System on Chip (SOC) package in accordance with various examples discussed herein.

In some examples, one or more of the components discussed herein can be embodied as a System On Chip (SOC) device. FIG. 9 illustrates a block diagram of an SOC package in accordance with an example. As illustrated in FIG. 9, SOC package 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
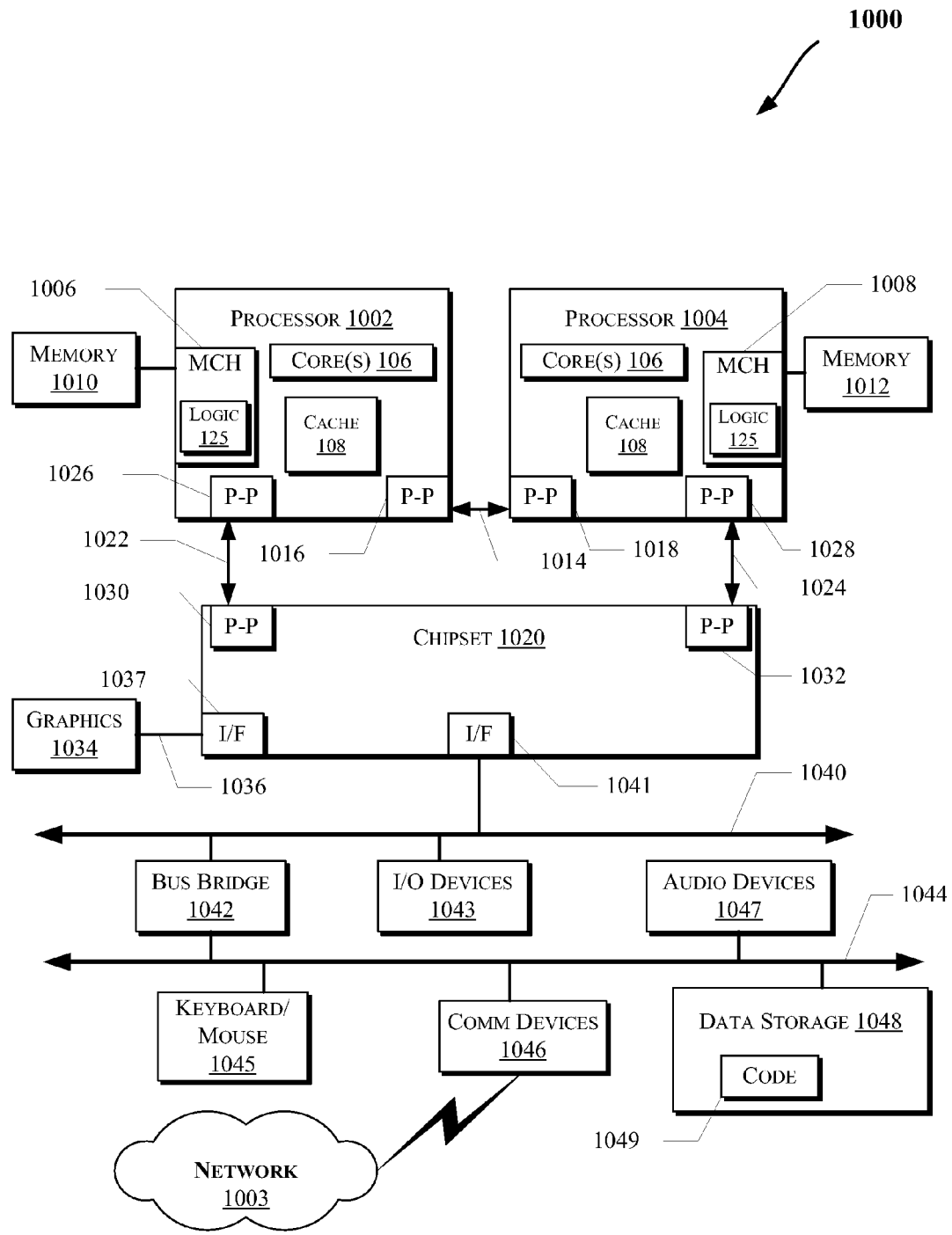
FIG. 10 illustrates a computing system that is arranged in a point-to-point configuration in accordance with various examples discussed herein.

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 122 of FIG. 1 and/or logic 125 of FIG. 10 in some examples.

In an example, the processors 1002 and 1004 may be one of the processors 702 discussed with reference to FIG. 7. The processors 1002 and 1004 may exchange data via a point-to-point (PtP or P-P) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 706 and/or cache 708 of FIG. 7 may be located within the processors 1002 and 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1042 may communicate with other devices such as a keyboard/mouse 1045, communication devices 1046 (such as modems, network interface devices, or other communication devices that may communicate with the computer network 803, shown in FIG. 8), audio I/O device, and/or a data storage device 1048. The data storage device 1048 (which may be a hard disk drive or a NAND flash based solid state drive) may store code 1049 that may be executed by the processors 1002 and/or 1004.

The following examples pertain to further examples.

Example 1 is a controller comprising logic to receive a first transaction to operate on a first data element in a volatile memory, determine whether the first data element is to be stored in a nonvolatile memory, and, in response to a determination that the first data element is to be stored in the nonvolatile memory, to forward the first transaction to the memory controller coupled to the nonvolatile memory.

In Example 2, the controller of Example 1 can optionally include logic to consult a source address decoder table which is to determine whether the first data element is to be stored in the nonvolatile memory.

In Example 3, the controller of any one of Examples 1-2 can optionally include logic to receive a confirmation signal from the memory controller that the first data element was stored in the nonvolatile memory and return a completion signal to an originator of the first transaction.

In Example 4, the controller of any one of Examples 1-3 can optionally include logic to receive a second transaction to operate on a second data element in the volatile memory, determine whether the second data element is to be stored in the nonvolatile memory, and, in response to a determination that the second data element is to be stored in the volatile memory, to drop the second transaction.

In Example 5, the controller of Example 4 can optionally include logic to return a completion signal to an originator of the second transaction.

In Example 6, the controller of any one of Examples 1-5 can optionally include an arrangement in which the controller is coupled to a processor core, and the controller futher comprises logic to block additional transactions on the processor core.

In Example 7, the controller of Example 6 can optionally include logic to place the processor core in a low power state.

Example 8 is an apparatus, comprising at least one processor, a volatile memory communicatively coupled to the at least one processor, a controller communicatively coupled to the volatile memory, where the controller comprises logic to receive a first transaction to operate on a first data element in the volatile memory, determine whether the first data element is to be stored in a nonvolatile memory, and, in response to a determination that the first data element is to be stored in the nonvolatile memory, to forward the first transaction to the memory controller coupled to the nonvolatile memory.

In Example 9, the controller in the apparatus of Example 8 can optionally include logic to consult a source address decoder table that is to determine whether the first data element is to be stored in the nonvolatile memory In Example 10, the controller in the apparatus of any one of Examples 8-9 can optionally include logic to receive a confirmation signal from the memory controller that the first data element was stored in the nonvolatile memory, and return a completion signal to an originator of the first transaction.

In Example 11, the controller in the apparatus of any one of Examples 8-10 can optionally include logic to receive a second transaction to operate on a second data element in the volatile memory, determine whether the second data element is to be stored in the nonvolatile memory, and, in response to the determination that the second data element is to be stored in the volatile memory, to drop the second transaction.

In Example 12, the controller in the apparatus of Example 11 can optionally include logic to return a completion signal to an originator of the second transaction.

In Example 13, the controller in the apparatus of any one of Examples 8-12 can optionally include an arrangement in which the controller is coupled to a processor core, and the controller further comprises logic to block additional transactions on the processor core.

In Example 14, the controller in the apparatus of Example 13 can optionally include logic to place the processor core in a low power state.

Example 15 is an electronic device, comprising a non-volatile memory device, at least one processor, a volatile memory communicatively coupled to the at least one processor, a controller communicatively coupled to the volatile memory and comprising logic to receive a first transaction to operate on a first data element in the volatile memory, determine whether the first data element is to be stored in a nonvolatile memory, and, in response to a determination that the first data element is to be stored in the nonvolatile memory, to forward the first transaction to the memory controller coupled to the nonvolatile memory.

In Example 16, the controller in the electronic device of Example 15 can optionally include logic to consult a source address decoder table that is to determine whether the first data element is to be stored in the nonvolatile memory In Example 17, the controller in the electronic device of any one of Examples 15-16 can optionally include logic to receive a confirmation signal from the memory controller that the first data element was stored in the nonvolatile memory and return a completion signal to an originator of the first transaction.

In Example 18, the controller in the electronic device of any one of Examples 15-17 can optionally include logic to receive a second transaction to operate on a second data element in the volatile memory, determine whether the second data element is to be stored in the nonvolatile memory, and, in response to a determination that the second data element is to be stored in the volatile memory, to drop the second transaction.

In Example 19, the controller in the electronic device of Example 18 can optionally include logic to return a completion signal to an originator of the second transaction.

In Example 20, the controller in the electronic device of any one of Examples 15-19 can optionally include an arrangement in which the controller is coupled to a processor core, and the controller further comprises logic to block additional transactions on the processor core.

In Example 21, the controller in the electronic device of Example 20 can optionally include logic to place the processor core in a low power state.

Example 22 is a computer program product comprising logic instructions stored in a non-transitory computer readable medium that, when executed by a controller, configure the controller to receive a first transaction to operate on a first data element in a volatile memory, determine whether the first data element is to be stored in the nonvolatile memory, and, in response to a determination that the first data element is to be stored in the nonvolatile memory, to forward the first transaction to the memory controller coupled to the nonvolatile memory.

In Example 23, the computer program product of Example 22 can optionally include logic instructions to further configure the controller to consult a source address decoder table that is to determine whether the first data element is to be stored in the nonvolatile memory In Example 24, the computer program product of any one of Examples 22-23 can optionally include logic to receive a confirmation signal from the memory controller that the first data element was stored in the nonvolatile memory and return a completion signal to an originator of the first transaction.

In Example 25, the computer program product of any one of Examples 22-24 can optionally include logic instructions to further configure the controller to receive a second transaction to operate on a second data element in the volatile memory, determine whether the second data element is to be stored in the nonvolatile memory, and, in response to the determination that the second data element is to be stored in the volatile memory, to drop the second transaction.

In Example 26, the computer program product of Example 25 can optionally include logic instructions to further configure the controller to return a completion signal to an originator of the second transaction.

In Example 27, the computer program product of any one of Examples 22-26 can optionally include logic instructions to further configure the controller to block additional transactions on a processor core coupled to the controller.

In Example 28, the computer program product of Example 27 can optionally include logic instructions to further configure the controller to place the processor core in a low power state.

In various examples, the operations discussed herein, e.g., with reference to FIGS. 1-10, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A computing device, comprising:
 a processor comprising multiple processing units, with each processing unit respectively including:
  a core;
  a cache memory;
  a source address decoder; and
  a cache controller coupled to the cache memory, the core, and the source address decoder, the cache controller configured to:
   receive a cache transaction from the core to operate on a data element in the cache memory;
   determine whether the data element is to be stored in a nonvolatile memory by querying the source address decoder; and
   in response to a determination that the data element is to be stored in the nonvolatile memory, to forward the cache transaction from the cache controller over a communication bus to a memory controller coupled to the nonvolatile memory via a memory channel; and
   in response to a determination that the data element is not to be stored in the nonvolatile memory, to drop the cache transaction from a cache flush procedure of the cache controller.

2. The device of claim 1, wherein the cache controllers of the multiple processing units are structurally configured to operate in parallel with respect to one another.

3. The device of claim 1, wherein each cache controller is further configured to:
 receive a confirmation signal from the memory controller that the data element was stored in the nonvolatile memory; and
 return a completion signal to the associated core.

4. The device of claim 1, wherein each cache controller is further configured to return a completion signal to the associated core upon dropping the cache transaction.

5. The device of claim 1, wherein each cache controller is further configured to block additional transactions on the associated core.

6. The device of claim 5, wherein each cache controller is further configured to place the associated core in a low power state.

7. The device of claim 1, wherein the nonvolatile memory is communicatively coupled to each processing unit.

* * * * *